(12) United States Patent
Yamaguchi

(10) Patent No.: US 8,384,953 B2
(45) Date of Patent: Feb. 26, 2013

(54) IMAGE FORMING APPARATUS, INFORMATION REGISTRATION METHOD, AND COMPUTER PROGRAM PRODUCT

(75) Inventor: Hiroshi Yamaguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 399 days.

(21) Appl. No.: 12/761,487

(22) Filed: Apr. 16, 2010

(65) Prior Publication Data
US 2010/0271669 A1 Oct. 28, 2010

(30) Foreign Application Priority Data

Apr. 27, 2009 (JP) ................................. 2009-107644

(51) Int. Cl.
*H04N 1/04* (2006.01)
(52) U.S. Cl. ....... 358/1.9; 358/1.15; 358/1.11; 358/1.12
(58) Field of Classification Search ................... 358/1.9, 358/1.15, 1.11, 1.12, 474
See application file for complete search history.

(56) References Cited

U.S. PATENT DOCUMENTS

| 8,139,262 B2* | 3/2012 | Hamashima et al. | 358/1.9 |
| 8,171,409 B2* | 5/2012 | Shiono et al. | 715/707 |
| 2009/0009652 A1* | 1/2009 | Sudo et al. | 348/349 |

FOREIGN PATENT DOCUMENTS

JP 4444766 1/2010

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An image forming apparatus includes an operating and display unit that displays information and receives inputs entered by a user; a display control unit that displays, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable; an input control unit that receives selection of a desired setting item made on the detailed display displayed on the operating and display unit; and a registration unit that registers the function-selection information of the setting item, the selection of which has been received, on the simplified display.

7 Claims, 10 Drawing Sheets

IMAGE FORMING APPARATUS, INFORMATION REGISTRATION METHOD, AND COMPUTER PROGRAM PRODUCT

CROSS-REFERENCE TO RELATED APPLICATIONS

The present application claims priority to and incorporates by reference the entire contents of Japanese Patent Application No. 2009-107644 filed in Japan on Apr. 27, 2009.

BACKGROUND OF THE INVENTION

1. Field of the Invention

The present invention is directed generally to an image forming apparatus, an information registration method, and a computer program product.

2. Description of the Related Art

Users of image forming apparatuses, such as a copying machine, a printer apparatus, a scanner apparatus, a facsimile apparatus, and a multifunction peripheral, have conventionally adjusted initial settings and settings related to image forming processing from an operating and display unit, such as a control panel. Such settings are typically adjusted by a user by selecting a desired setting item from a list of specifiable setting items displayed on the operating and display unit.

In many cases, however, a large number of such setting items are provided and, even after one setting item has been selected, it is required to select a lower-level item for the setting item. Accordingly, after selecting one setting item, a user is typically required to select a lower-level item from a list of lower-level items of the thus-selected one setting item, making adjustment of settings for setting items troublesome for users.

To this end, a technique of displaying a simplified display that displays only representative setting items from among setting items displayed on a detailed display that contains a list of setting items in detail such that settings for the representative items are displayed in a simplified fashion as function-selection information sets, such as gadgets or icons, to thereby allow a user to select a desired setting item from the simplified display has been devised and known.

However, because such a technique of adjusting settings with use of a simplified display as discussed above is disadvantageous in that because setting items and setting descriptions are determined in advance, the simplified display is not necessarily appropriate for every user, which has aroused a desire for easy customization of the simplified display.

For instance, a technique for configuring a layout of a web page is disclosed in Japanese Patent Application Laid-open No. 2006-72750; however, this conventional technique requires a user to specify layouts of icons and the like in detail, and does not allow the user to suitably customize layout of the simplified display with ease.

SUMMARY OF THE INVENTION

It is an object of the present invention to at least partially solve the problems in the conventional technology.

According to an aspect of the present invention, there is provided an image forming apparatus that includes an operating and display unit that displays information and receives inputs entered by a user; a display control unit that displays, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable; an input control unit that receives selection of a desired setting item made on the detailed display displayed on the operating and display unit; and a registration unit that registers the function-selection information of the setting item, the selection of which has been received, on the simplified display.

According to another aspect of the present invention, there is provided an information registration method to be performed on an image forming apparatus that includes an operating and display unit that displays information and receives inputs entered by a user; a display control unit; an input control unit; and a registration unit. The information registration method includes displaying, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable, under control of the display control unit; receiving, by the input control unit, selection of a desired setting item made on the detailed display displayed on the operating and display unit; and registering, by the registration unit, the function-selection information of the setting item, the selection of which has been received, on the simplified display.

According to still another aspect of the present invention, there is provided a computer program product that causes a computer to execute the method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. In the embodiments, an example where an image forming apparatus according to an aspect of the present invention is an multifunction peripheral (MFP) that includes at least two of multiple functions, such as a copier function, a facsimile function, and a printer function, in a single enclosure will be described; however, the image forming apparatus is not limited thereto, and the present invention can be applied to a copying machine, a facsimile apparatus, a scanner apparatus, or the like.

First Embodiment

Figure 1:
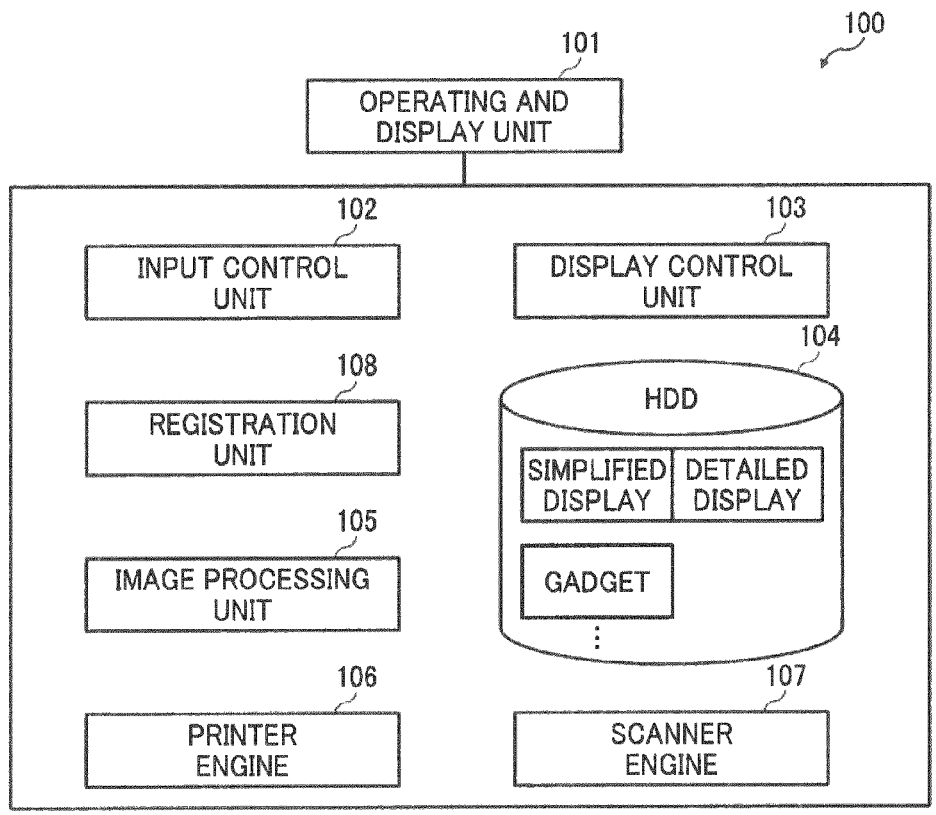
FIG. 1 is a block diagram illustrating the configuration of a multifunction peripheral according to a first embodiment of the present invention.

FIG. 1 is a block diagram illustrating the configuration of an MFP 100 according to a first embodiment of the present invention. As illustrated in FIG. 1, the MFP 100, to which an operating and display unit 101 is connected, generally includes a hard disk drive (HDD) 104, a display control unit 103, an input control unit 102, a registration unit 108, an image processing unit 105, a printer engine 106, and a scanner engine 107.

The operating and display unit 101 displays various information sets, such as various screens, and receives various inputs entered from a displayed screen by a touch operation performed by a user. The operating and display unit 101 can be, for instance, a liquid crystal touch panel.

The HDD 104 is a storage unit that stores various screens to be displayed on the operating and display unit 101. Examples of the various screens include a detailed display and a simplified display. The detailed display is a screen, on which setting contents of setting items related to operations to be performed by the MFP 100 can be specified in detail. The simplified display is a screen that contains one or more gadgets each representing setting contents of a predetermined setting item among the setting items displayed on the detailed display in a manner that the setting contents of the predetermined setting item are specifiable. This allows settings for setting items that are frequently used by a user on the simplified display. The HDD 104 stores the gadgets to be displayed on the simplified display.

Figure 2:
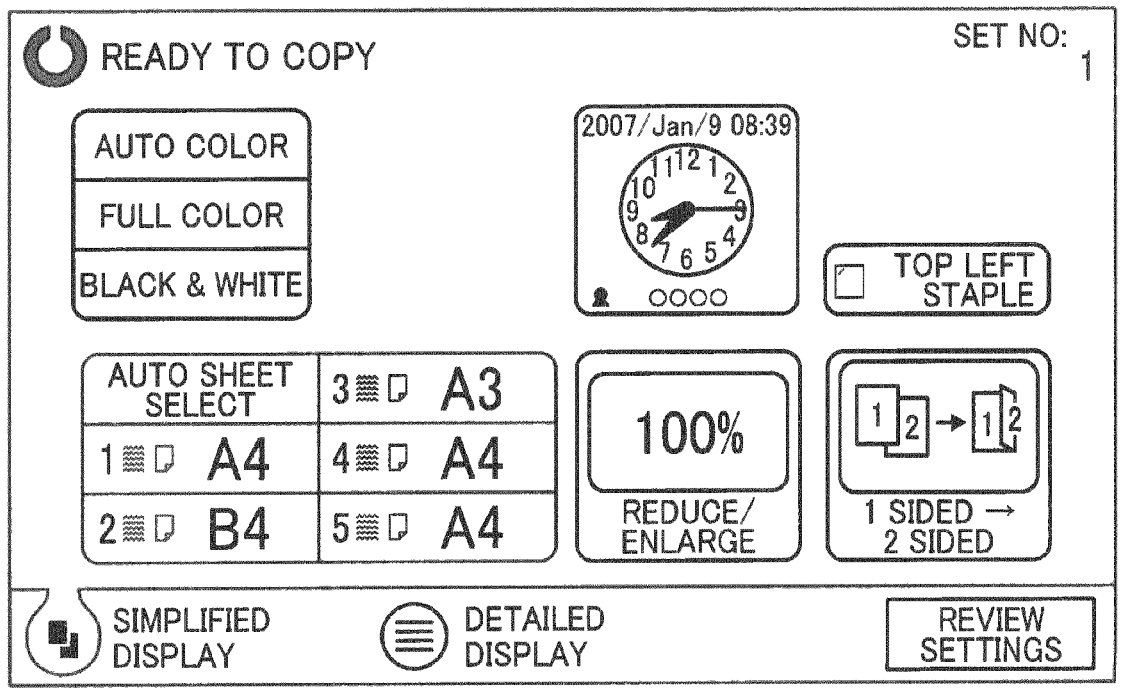
FIG. 2 is a diagram illustrating an example of a simplified display in a mode for copying function.

FIG. 2 is a diagram illustrating an example of the simplified display in a mode for copying function. As illustrated in FIG. 2, gadgets of setting items that are frequently used among a plurality of setting items are displayed on the simplified display. Specifically, in the example illustrated in FIG. 2, a color-selection setting item for selecting color print or black-and-white print, a sheet-size setting item for selecting a sheet size, a reduce/enlarge-ratio setting item for specifying a print reduce/enlarge ratio, a print-side setting item for specifying to-be-printed side, such as one-sided or two-sided, and the like are displayed. When a setting item is selected by a user from the displayed setting items, settings are performed according to the thus-selected setting item. A simplified display button and a detailed display button for receiving switching to a corresponding one of the simplified display and the detailed display are arranged on a lower portion of the screen. FIG. 2 illustrates an example where the simplified display button has been selected.

Figure 3:
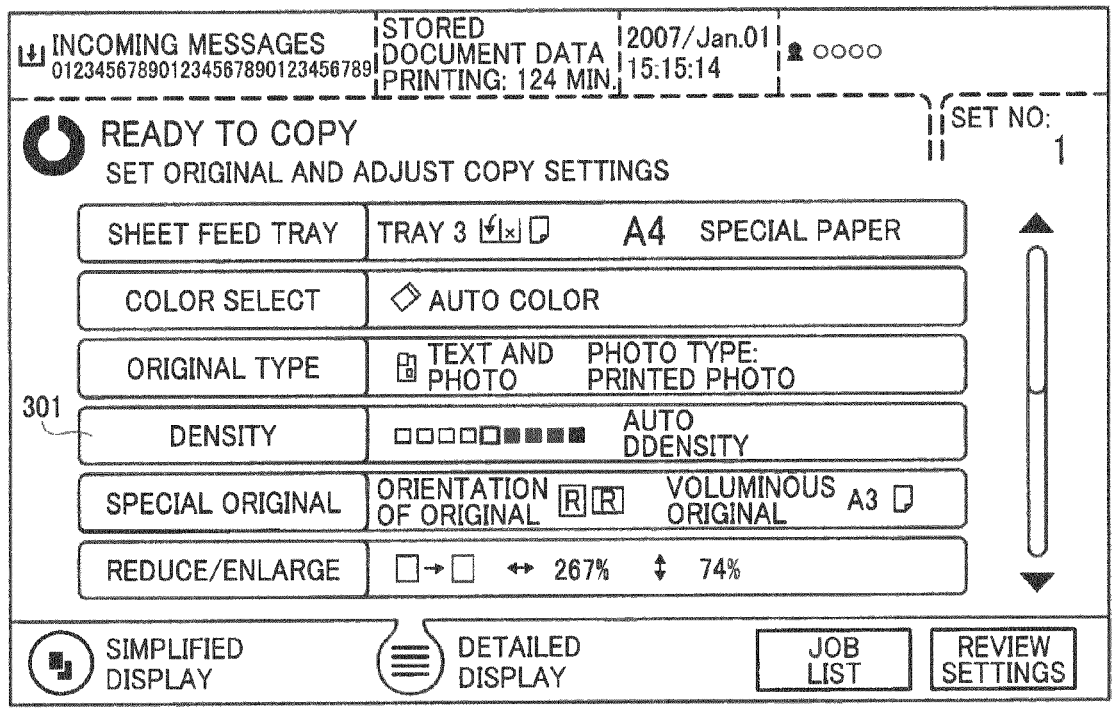
FIG. 3 is a diagram illustrating an example of a detailed display in a mode for copying function.

FIG. 3 is a diagram illustrating an example of the detailed display in a mode for copying function. As illustrated in FIG. 3, a plurality of setting items is displayed on the detailed display. Specifically, in the example illustrated in FIG. 3, a sheet-feed-tray setting item for selecting a sheet size and a sheet feed tray, the color-selection setting item for selecting color print or black-and-white print, an original-type setting item for selecting a type of an original, such as text and photo, a density setting item for specifying a print density, and the like are displayed. When a setting item has been selected from the displayed setting items by a user, a screen (setting dialog box), on which contents of the thus-selected setting item are to be specified, appears so that setting contents of the selected setting item are specified in detail. As in the simplified display, a simplified display button and a detailed display button for receiving switching to a corresponding one of the simplified display and the detailed display are arranged on a lower portion of the screen. FIG. 3 illustrates an example where the detailed display button has been selected.

Figure 4:
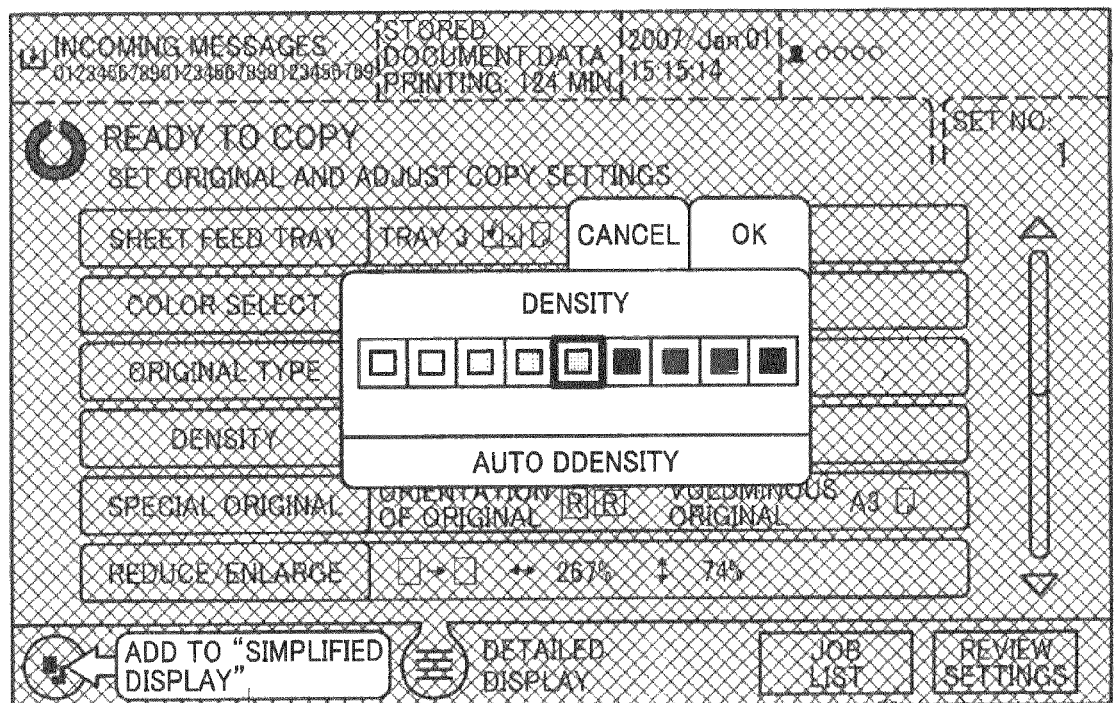
FIG. 4 is a diagram illustrating a setting dialog box.

The display control unit 103 performs control operations to display the simplified display or the detailed display on the operating and display unit 101. When the input control unit 102 receives selection of a desired setting item made on the detailed display, which will be described later, the display control unit 103 displays a pop-up setting dialog box, from which settings for the thus-selected setting item are to be specified, on the operating and display unit 101. FIG. 4 is a diagram illustrating an example of the setting dialog box. If, for instance, a density setting item 301 has been selected from the detailed display illustrated in FIG. 3, a pop-up setting dialog box, from which print density can be specified, appears as illustrated in FIG. 4. A user specifies a desired print density from this setting dialog box. A registration button 401 for use in registration of the print-density setting item on the simplified display is arranged at a lower-left portion of the setting dialog box.

Figure 5:
FIG. 5 is a diagram illustrating an example of a gadget candidate list.

When the input control unit 102 receives an instruction to register a desired setting item on the simplified display through the setting dialog box, the display control unit 103 displays, on the operating and display unit 101, a gadget candidate list, which is a list of gadget candidates for the desired setting item, in a manner that one of the gadget is selectable. FIG. 5 is a diagram illustrating an example of the gadget candidate list. If, for instance, the registration button 401 is pressed on the setting screen illustrated in FIG. 4, a list that contains print-density gadget candidates to be displayed on the simplified display is displayed as the gadget candidate list. On the right side of the gadget candidate list, a registration button for use in registration of a selected gadget on the simplified display is arranged.

Figure 6:
FIG. 6 is a diagram illustrating an example of the simplified display, to which a selected gadget has been added.

If the input control unit 102 receives selection of a gadget of a desired setting item from the gadget candidate list, the display control unit 103 displays the simplified display, on which the gadget has been registered by the registration unit 108, which will be described later, on the operating and display unit 101. FIG. 6 is a diagram illustrating an example of the simplified display, on which a selected gadget has been registered. For instance, when a lower one of the gadgets illustrated in FIG. 5 is selected and a registration button 501 is pressed, as illustrated in FIG. 6, a simplified display that contains a print-density gadget 601 appears on the operating and display unit 101. Displaying the simplified display, on which a desired setting item has been registered, in this manner to allow a user to specify settings for the desired setting item from the simplified display.

The input control unit 102 receives selection of a desired setting item made on the simplified display or the detailed display displayed on the operating and display unit 101. When a setting dialog box of a desired setting item selected from the detailed display is displayed on the operating and display unit 101, the input control unit 102 also receives an entry, which is entered by a user from the setting dialog box, specifying setting contents of the desired setting item. In the example illustrated in FIG. 4, an entry specifying a desired print density is received. The input control unit 102 also receives an instruction, which is entered from the setting dialog box, to register the setting item on the simplified display. In the example illustrated in FIG. 4, the input control unit 102 receives pressing operation of the registration button 401 as an instruction to register the print-density setting item on the simplified display.

The input control unit 102 also receives an instruction, which is entered from the setting dialog box, to register the setting item on the simplified display, and, when a gadget candidate list appears on the operating and display unit 101, receives selection of a gadget of the desired setting item made from the gadget candidate list.

The registration unit 108 updates the gadget of the setting item, the selection of which has been received by the input control unit 102, to reflect the setting contents specified by the entry entered from the setting dialog box, and registers the gadget on the simplified display. If the simplified display has no more blank area where another gadget can be displayed (registered), the registration unit 108 causes the operating and display control unit 101 to display a to-be-replaced-gadget-selection dialog box, and registers the gadget selected from the gadget candidate list on the simplified display by replacing a gadget selected from the to-be-replaced-gadget-selection dialog box with the gadget selected from the gadget candidate list on the simplified display.

The image processing unit 105 performs processing for generating image data to be printed from an image temporarily stored in an image memory (not shown), and the like. The printer engine 106 prints the image data generated by the image processing unit 105 on a sheet. The scanner engine 107 reads an image of a placed original.

Figure 7:
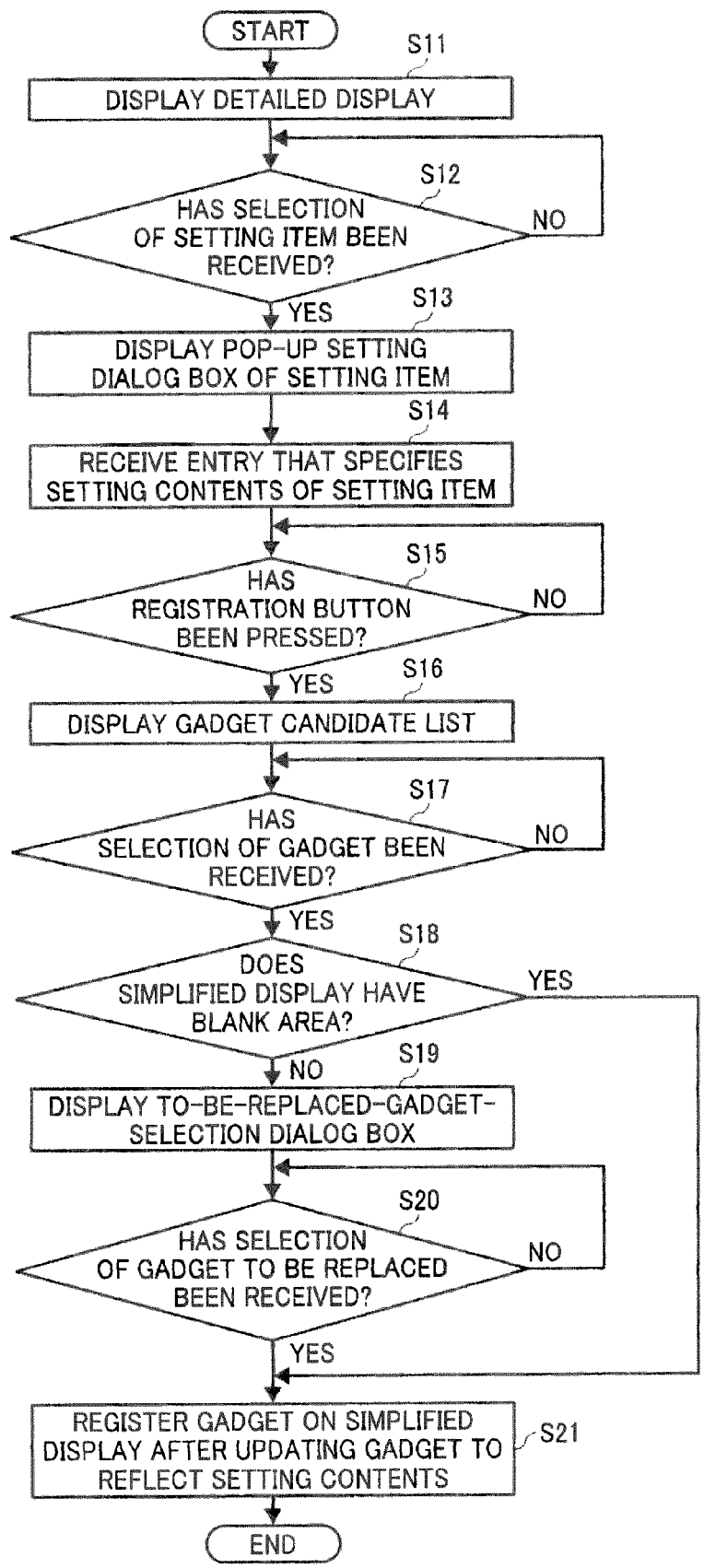
FIG. 7 is a flowchart of a procedure of a gadget addition process to be performed by the multifunction peripheral.

Operations to be performed by the MFP 100 configured as discussed above to register a gadget of a selected setting item will be described below. FIG. 7 is a flowchart of a procedure of a gadget registration process to be performed by the MFP. An example of operations that involve the setting dialog box of FIG. 4 and the gadget candidate list of FIG. 5 is described below.

To perform gadget registration, the display control unit 103 displays the detailed display on the operating and display unit 101 (Step S11). The display control unit 103 determines whether the input control unit 102 has received selection of a setting item made on the detailed display (Step S12), and if selection of a setting item has not been received (No at Step S12), waits until receipt of selection.

If selection of a setting item has been received (Yes at Step S12), the display control unit 103 displays a pop-up setting dialog box of the thus-selected setting item (Step S13). The input control unit 102 receives an entry, which is entered from the setting dialog box, specifying setting contents of the setting item (Step S14). Subsequently, the display control unit 103 determines whether the registration button for causing the setting item, the selection of which made from the setting dialog box has been received by the input control unit 102, to be registered on the simplified display has been pressed (Step S15). If the registration button has not been pressed (No at Step S15), the display control unit 103 waits until the registration button is pressed.

If the registration button has been pressed (Yes at Step S15), the display control unit 103 displays a gadget candidate list of the thus-selected setting item (Step S16). The display control unit 103 determines whether selection of a desired gadget made from the gadget candidate list has been received (Step S17). If selection of a gadget has not been received (No at Step S17), the display control unit 103 waits until receipt of selection.

If selection of a gadget has been received (Yes at Step S17), the registration unit 108 determines whether the simplified display has a blank area where the selected gadget can be added (Step S18). If there is no such blank area (No at Step S18), the display control unit 103 displays a to-be-replaced-gadget-selection dialog box (see FIG. 11 to be described later) (Step S19). The display control unit 103 determines whether selection of a gadget to be replaced made from the to-be-replaced-gadget-selection dialog box has been received (Step S20). If selection of a gadget to be replaced has not been received (No at Step S20), the display control unit 103 waits until receipt of selection.

If selection of a gadget to be replaced has been received (Yes at Step S20), the registration unit 108 registers the gadget selected from the gadget candidate list on the simplified display by replacing the gadget selected from the to-be-replaced-gadget-selection dialog box with the gadget selected from the gadget candidate list (Step S21). If it is determined that there is a blank area at Step S18 (Yes at Step S18), the registration unit 108 registers the gadget selected from the gadget candidate list on the simplified display (Step S21). When performing this gadget registration on the simplified display, the registration unit 108 registers the selected gadget on the simplified display after updating the selected gadget to reflect the setting contents specified by the entry entered from the setting dialog box.

The display control unit 103 displays the simplified display that contains the thus-registered gadget. In the example of the simplified display illustrated in FIG. 2, there is a blank area where a gadget can be registered; therefore, the selected gadget is registered without causing the to-be-replaced-gadget-selection dialog box to appear and hence without performing gadget replacement.

As discussed above, the MFP 100 of the first embodiment receives selection of a desired setting item made on the detailed display displayed on the operating and display unit 101 and registers a gadget of the thus-selected setting item on the simplified display, thereby allowing easy customization of the simplified display. Furthermore, with the MFP 100 of the first embodiment, a gadget of a predetermined setting item among the setting items displayed on the detailed display can be registered on the simplified display in response to pressing operation performed by a user through the detailed display. Accordingly, even when the operating and display unit 101 is a liquid crystal touch panel as in the first embodiment, gadget addition to the simplified display can be performed easily only by touch operation.

Second Embodiment

With the MFP 100 of the first embodiment, gadgets of setting items have been stored in the storage unit (HDD) of the MFP and, when a desired setting item is selected by a user, a gadget candidate list is displayed based on the gadgets stored in the MFP. In contrast, in a second embodiment of the present invention, a gadget candidate list that is based on, in addition to the function of the first embodiment, gadgets searched for and obtained from a network is displayed.

Figure 8:
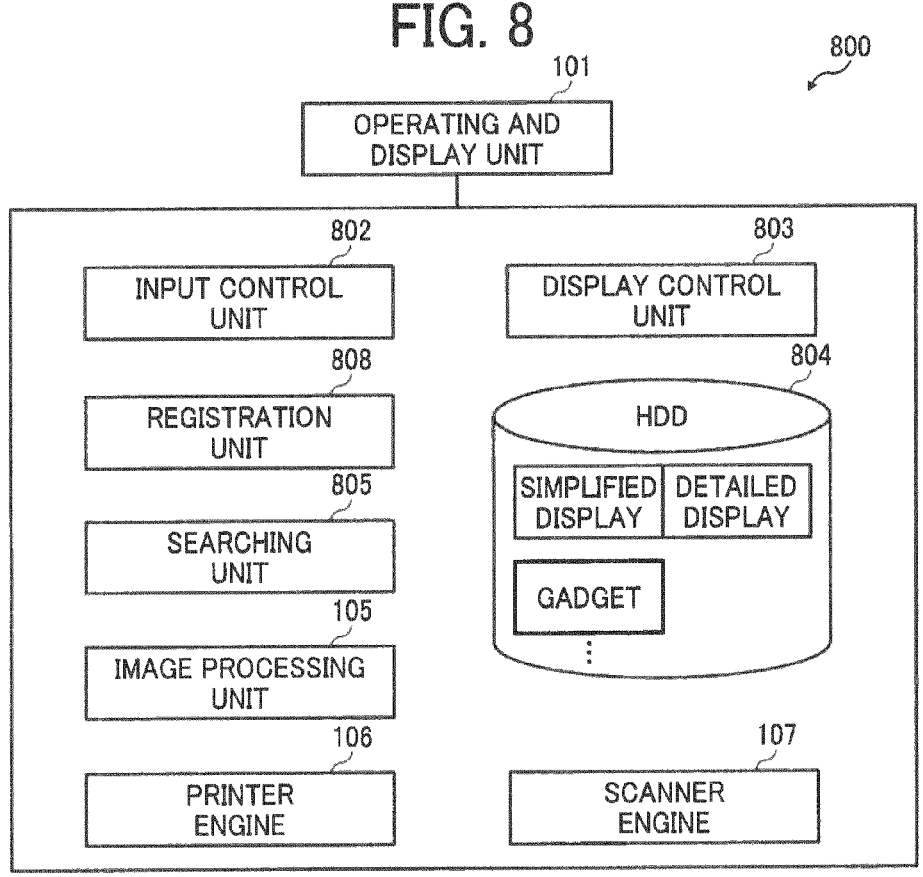
FIG. 8 is a block diagram illustrating the configuration of a multifunction peripheral according to a second embodiment of the present invention.

FIG. 8 is a block diagram illustrating the configuration of an MFP 800 according to the second embodiment. As illustrated in FIG. 8, the MFP 800, to which the operating and display unit 101 is connected, generally includes an HDD 804, a display control unit 803, an input control unit 802, a registration unit 808, the image processing unit 105, the printer engine 106, and the scanner engine 107. Configurations and functions of the operating and display unit 101, the image processing unit 105, the printer engine 106, and the scanner engine 107 are similar to those of the first embodiment, and hence repeated descriptions are omitted.

Figure 9:
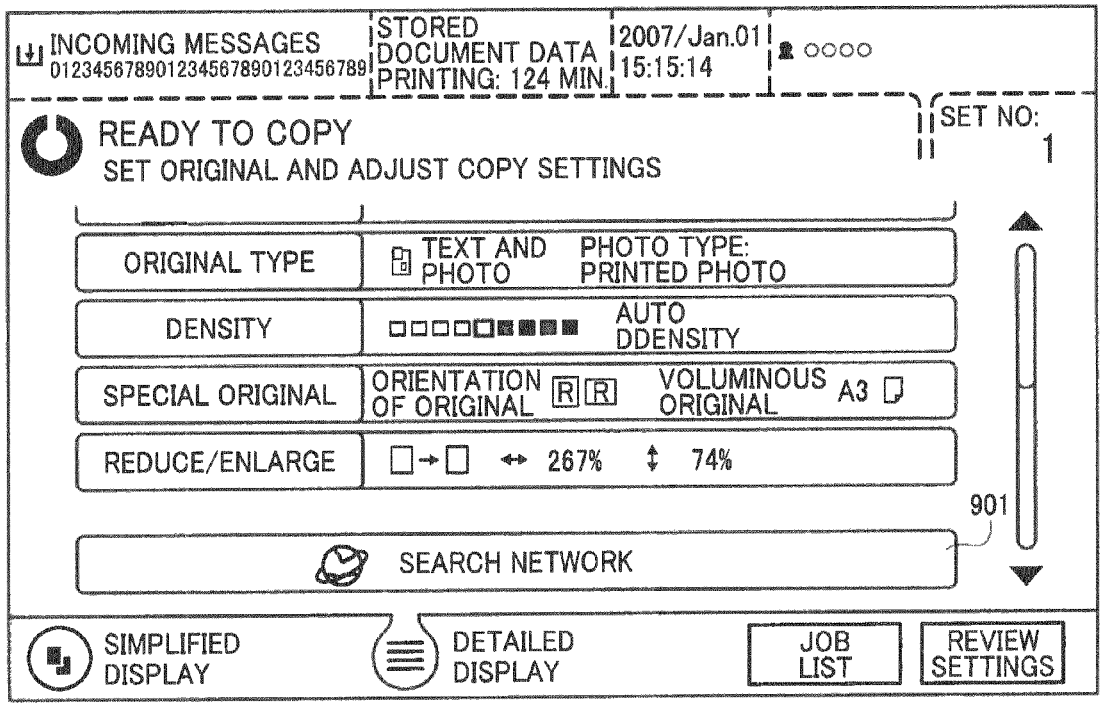
FIG. 9 is a diagram illustrating an example of a detailed display in a mode for copying function.

The HDD 804 is a storage unit that stores various displays, such as a detailed display and a simplified display, and gadgets to be displayed on the simplified display. The simplified display is similar to that of the first embodiment (see FIG. 2). The detailed display of the second embodiment differs from the detailed display of the first embodiment in additionally including a button for use in searching a network for gadgets. FIG. 9 is a diagram illustrating an example of the detailed display in a mode for copying function. As illustrated in FIG. 9, the detailed display of the second embodiment contains a "search network" button 901 that is for use in making a search through the network for gadgets and arranged at a lower position that comes into view when the detailed display illustrated in FIG. 3 is scrolled up.

A searching unit 805 searches the network for gadgets that can be displayed on the simplified display to obtain the gadgets upon receiving an instruction to search the network for gadgets different from the gadgets stored in the HDD 804. For instance, in FIG. 9, a search through the network for gadgets is performed when the "search network" button 901 is pressed.

The display control unit 803 performs control operations to display the simplified display or the detailed display on the operating and display unit 101. When the input control unit 802 receives selection of a desired setting item made on the detailed display, which will be described later, the display control unit 803 displays a pop-up setting dialog box, from which settings for the thus-selected setting item are to be specified, on the operating and display unit 101. When an instruction to register a desired setting item on the simplified display is entered from the setting dialog box and received by the input control unit 802, the display control unit 803 displays, on the operating and display unit 101, a gadget candidate list, which is a list of gadget candidates for the desired setting item, in a manner that one of the gadget is selectable. If the input control unit 802 receives selection of a gadget of a desired setting item made from the gadget candidate list, the display control unit 803 displays the simplified display, on which the gadget has been registered by the registration unit 808, which will be described later, on the operating and display unit 101.

Figure 10:
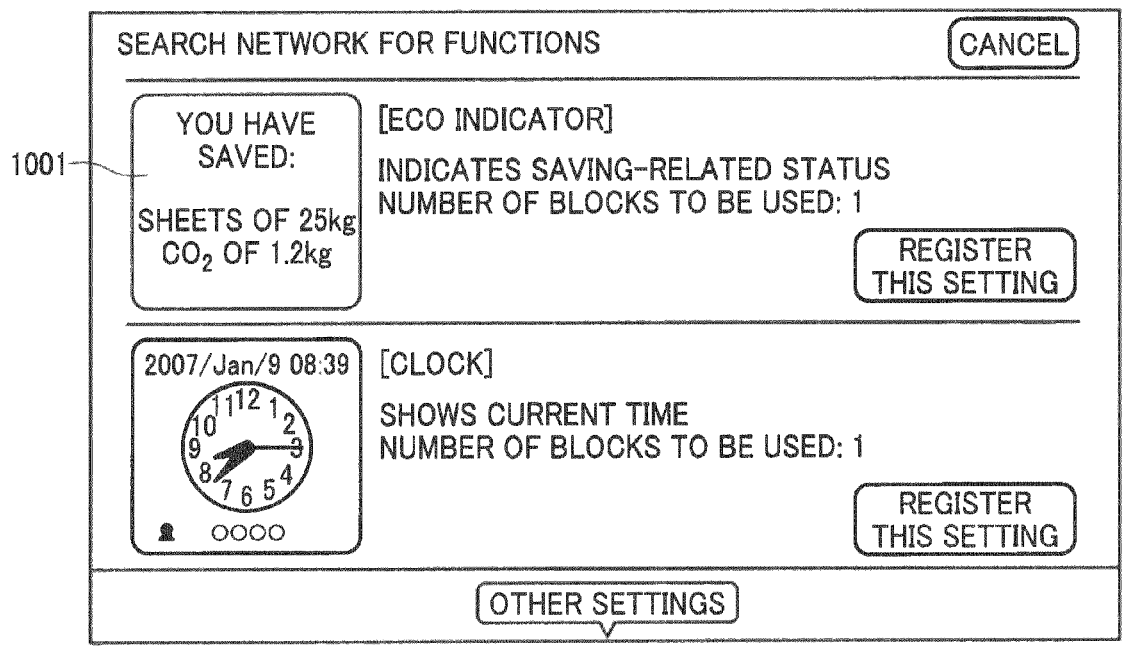
FIG. 10 is a diagram illustrating an example of a searched-gadget candidate list.

When the input control unit 802 receives an instruction to search the network for gadgets, the display control unit 803 displays, on the operating and display unit 101, a searched-gadget candidate list, which is a list of gadget candidates searched for and obtained by the searching unit 805, in a manner that one of the gadget is selectable. FIG. 10 is a diagram illustrating an example of the searched-gadget candidate list. If, for instance, the "search network" button 901 has been pressed from the setting dialog box illustrated in FIG. 9, a list that contains gadget candidates having been searched for and obtained is displayed as the gadget candidate list as illustrated in FIG. 10. Specifically, in the example illustrated in FIG. 10, an "ecology indicator" gadget that indicates a saving-related status and a "clock" gadget that shows the current time are displayed. On the right side of the searched-gadget candidate list, registration buttons each for use in registration of a selected gadget on the simplified display are arranged.

If the input control unit 802 receives selection of a desired gadget made from the searched-gadget candidate list, the display control unit 803 displays the simplified display, on which the gadget has been registered by the registration unit 808, which will be described later, on the operating and display unit 101. If the simplified display has no more blank area where another gadget can be displayed, the display control unit 803 displays the simplified display, on which the gadget having been newly selected is registered, by replacing a gadget that has already been displayed on the simplified display with the gadget having been newly selected, on the operating and display unit 101. The display control unit 803 also displays a to-be-replaced-gadget-selection dialog box, from which a gadget that has already been displayed and is to be replaced is selected, on the operating and display unit 101.

Figure 11:
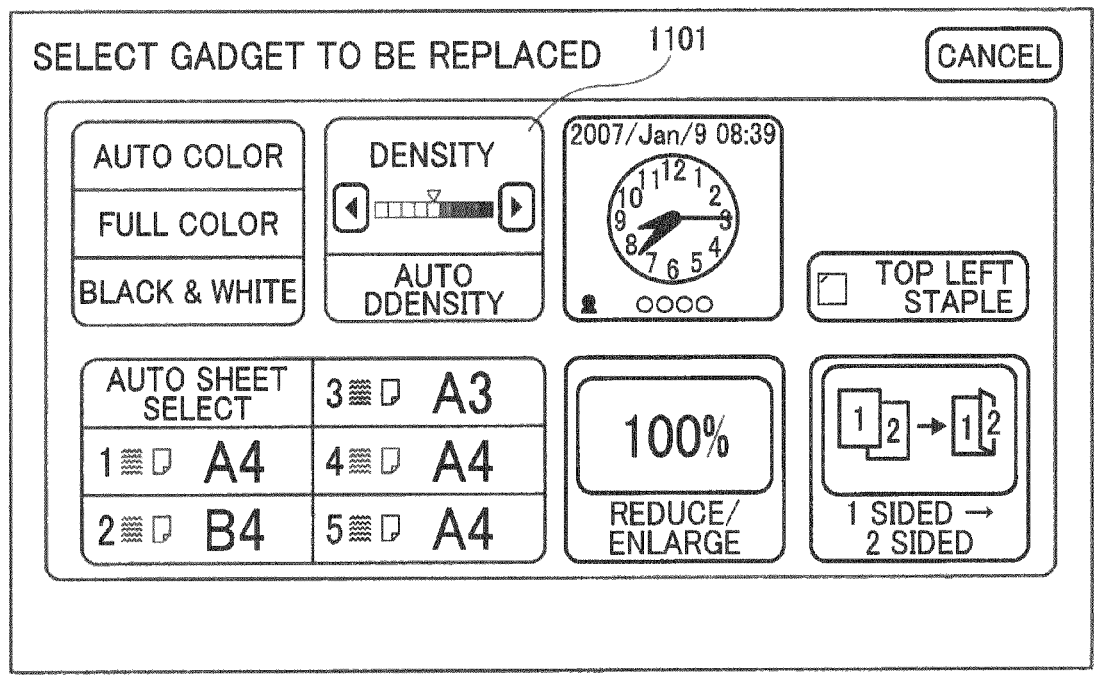
FIG. 11 is a diagram illustrating an example of a to-be-replaced-gadget-selection dialog box.
Figure 12:
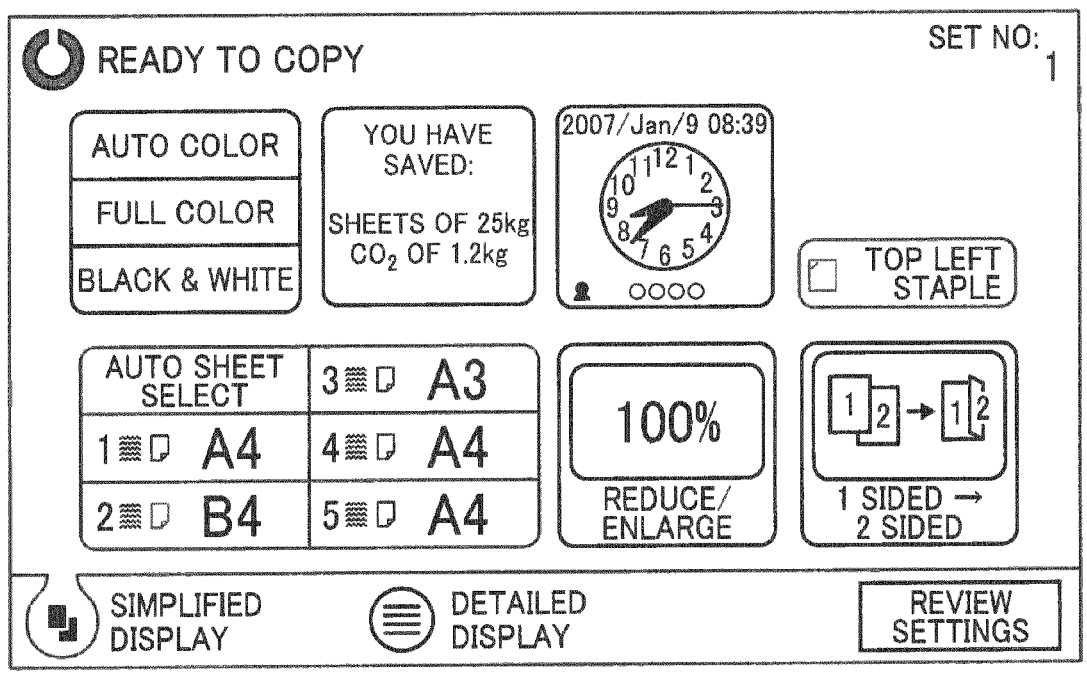
FIG. 12 is a diagram illustrating a simplified display having undergone replacement of an already-displayed gadget with a freshly-selected gadget.

FIG. 11 is a diagram illustrating an example of the to-be-replaced-gadget-selection dialog box. FIG. 12 is a diagram illustrating the simplified display having undergone replacement of an already-displayed gadget with a newly-selected gadget. If there is no more blank area where another gadget can be displayed, such a to-be-replaced-gadget-selection dialog box as that illustrated in FIG. 11 is displayed so as to receive selection of a gadget to be replaced, e.g., a density-setting-item gadget 1101. The density-setting-item gadget 1101 is registered on the simplified display by being replaced with an ecology-indicator gadget 1001 selected from the searched-gadget candidate list (see FIG. 10). Hence, the simplified display as illustrated in FIG. 12 is displayed on the operating and display unit 101.

The input control unit 802 receives selection of a desired setting item made on the simplified display or the detailed display displayed on the operating and display unit 101. When a setting dialog box of a desired setting item selected on the detailed display is displayed on the operating and display unit 101, the input control unit 802 also receives an entry, which is entered by a user from the setting dialog box, specifying setting contents of the desired setting item. The input control unit 802 also receives an instruction, which is entered from the setting dialog box, to register a setting item on the simplified display. The input control unit 802 also receives an instruction, which is entered from the detailed display, to search a network for gadgets. For instance, from the detailed display illustrated in FIG. 9, the input control unit 102 receives a pressing operation of the "search network" button 901.

When the input control unit 802 has received an instruction, which is entered from the setting dialog box, to register a setting item on the simplified display, and a gadget candidate list has appeared on the operating and display unit 101, the input control unit 802 also receives selection of a gadget of the desired setting item made from the gadget candidate list. When a searched-gadget candidate list obtained by performing a search through the network is displayed on the operating and display unit 101, the input control unit 802 also receives selection of a desired gadget made from the searched-gadget candidate list. If the simplified display has no more blank area where another gadget can be displayed, the input control unit 802 receives selection, which is to be made from the to-be-replaced-gadget-selection dialog box, of a gadget to be replaced with the newly-selected gadget.

The registration unit 808 updates the gadget of the setting item, the selection of which has been received by the input control unit 802, to reflect the setting contents specified from the setting dialog box, and registers the gadget on the simplified display. The registration unit 808 registers the gadget selected from the searched-gadget candidate list on the simplified display. If the simplified display has no more blank area where another gadget can be displayed, the registration unit 808 registers the gadget selected from the searched-gadget candidate list on the simplified display by replacing the gadget selected from the to-be-replaced-gadget-selection dialog box with the gadget selected from the searched-gadget candidate list.

Figure 13:
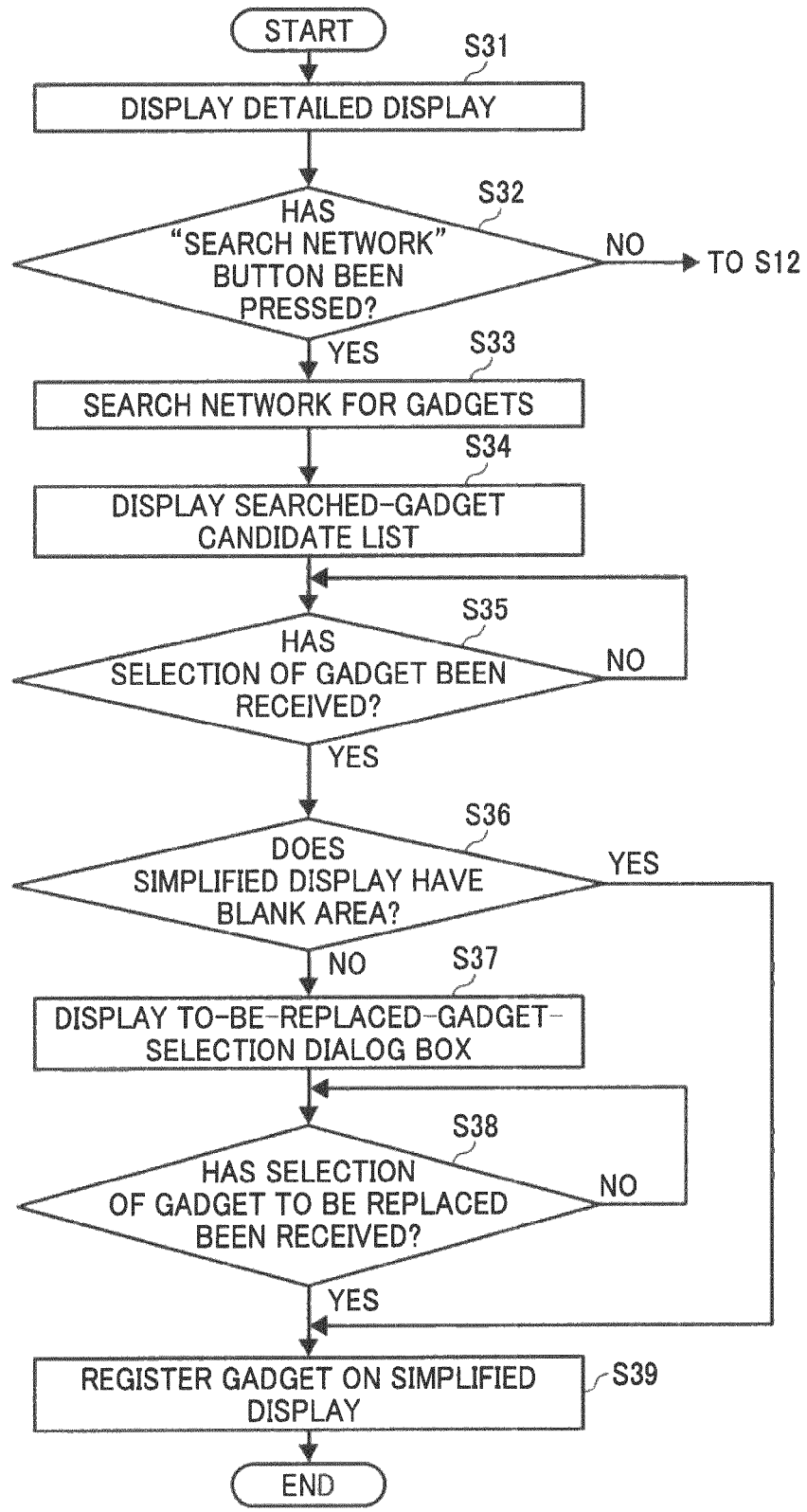
FIG. 13 is a flowchart of a procedure of a gadget addition process to be performed by the multifunction peripheral.

Operations to be performed by the MFP 800 configured as discussed above to register a gadget searched for and obtained from the network will be described below. FIG. 13 is a flowchart of a procedure of a gadget registration process to be performed by the MFP. An example of operations that involve the detailed display of FIG. 9, the searched-gadget candidate list of FIG. 10, and the to-be-replaced-gadget-selection dialog box of FIG. 11 is described below.

To perform gadget registration, the display control unit 803 displays the detailed display on the operating and display unit 101 (Step S31). The searching unit 805 determines whether the "search network" button 901 on the detailed display has been pressed (Step S32). If the "search network" button 901 has not been pressed (No at Step S32), control proceeds to Step S12 in the procedure illustrated in FIG. 7.

If the "search network" button 901 has been pressed (Yes at Step S32), the searching unit 805 searches the network for gadgets and obtains gadgets found on the network (Step S33). The display control unit 803 displays a searched-gadget candidate list that contains the gadgets searched for and obtained by the searching unit 805 (Step S34). The display control unit 803 determines whether selection of a gadget from the searched-gadget candidate list has been received (Step S35). If selection of a gadget has not been received (No at Step S35), the display control unit 803 waits until receipt of selection.

If selection of a gadget has been received (Yes at Step S35), the registration unit 808 determines whether the simplified display has a blank area where the gadget, the selection of which has been received, can be registered (Step S36). If there is no such blank area (No at Step S36), the display control unit 803 displays the to-be-replaced-gadget-selection dialog box (Step S37). The display control unit 803 determines whether selection of a gadget to be replaced made from the to-be-replaced-gadget-selection dialog box has been received (Step S38). If selection of a gadget to be replaced has not been received (No at Step S38), the display control unit 103 waits until receipt of selection.

If selection of a gadget to be replaced has been received (Yes at Step S38), the registration unit 808 registers the gadget selected from the searched-gadget candidate list on the simplified display by replacing the gadget selected from the to-be-replaced-gadget-selection dialog box with the gadget selected from the searched-gadget candidate list (Step S39). If it is determined that there is a blank area at Step S36 (Yes at Step S36), the registration unit 808 registers the gadget selected from the searched-gadget candidate list on the simplified display (Step S39). The display control unit 803 displays the simplified display, on which the gadget has thus been registered.

As discussed above, the MFP 800 of the second embodiment receives an instruction, which is entered from the detailed display displayed on the operating and display unit 101, to search through the network for gadgets and registers gadgets searched for and obtained to the simplified display, thereby allowing easy customization of the simplified display. Furthermore, with the MFP 800 of the second embodiment, gadgets searched for and obtained from the network can be registered on the simplified display in response to pressing operation performed by a user. Accordingly, even when the operating and display unit 101 is a liquid crystal touch panel as in the second embodiment, gadget registration on the simplified display can be performed easily only by touch operation. With the MFP 800, if the simplified display has no more blank area where gadgets obtained by the search can be displayed, a desired gadget of the gadgets obtained by the search can be registered by replacing a gadget having already been displayed on the simplified display with the gadget of the gadgets obtained by the search.

In the second embodiment, gadgets other than the gadget of the setting item selected from the detailed display are searched for through the network and registered on the simplified display; however, another configuration, in which the gadget of the setting item selected from the detailed display is searched for through the network and registered to the simplified display, can be employed.

In the second embodiment, if the simplified display has no more blank area where a gadget obtained by the search can be displayed, registration of the gadget obtained by the search is performed by replacing a gadget having already been displayed on the simplified display with the gadget obtained by search. This is also applicable to the first embodiment. More specifically, if the simplified display has no more blank area where a gadget of a selected setting item can displayed, registration of this gadget can be performed by replacing a gadget having already been displayed on the simplified display with the gadget of the selected setting item.

In the first and second embodiments, examples where gadgets are used as function-selection information have been described; however, the function-selection information is not limited to gadgets. For instance, various graphical indicative information, such as icons and widgets, can be used as function-setting information. In the first and second embodiments, examples where the operating and display unit 101 is a liquid crystal touch panel have been described, but not limited thereto. The present invention can be applied to any operating and display unit irrespective of input and/or display method.

(Modifications of First and Second Embodiments)

Figure 14:
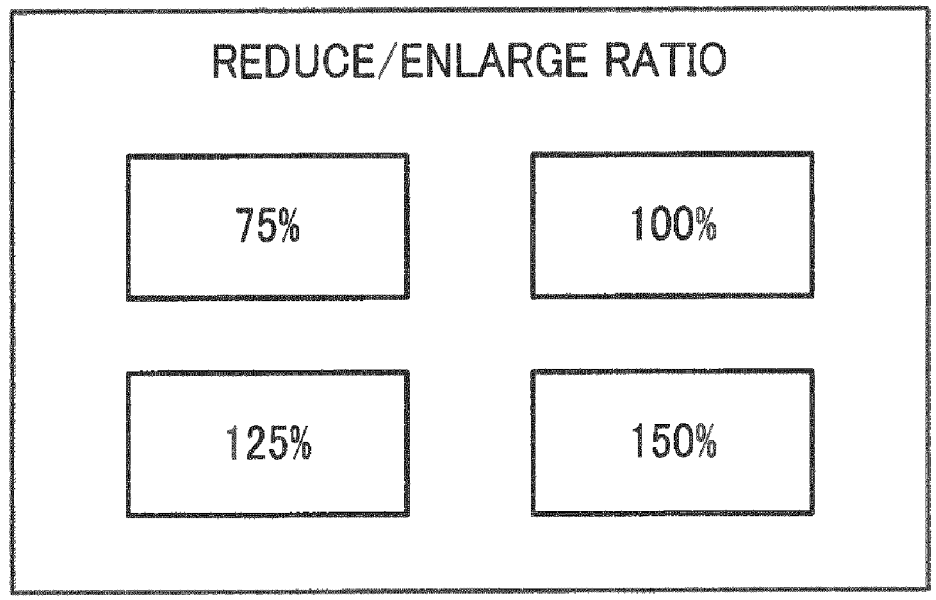
FIG. 14 is a diagram illustrating an example of a reduce/enlarge-ratio item gadget for use in specifying a reduce/enlarge ratio.
Figure 15:
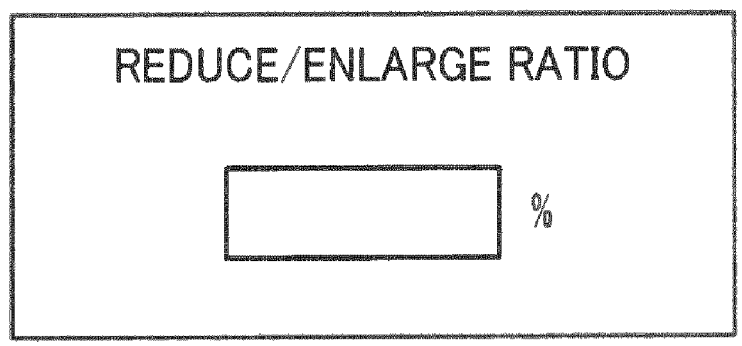
FIG. 15 is a diagram illustrating another example of the reduce/enlarge-ratio item gadget for use in specifying a reduce/enlarge ratio.

In the simplified display of the first and second embodiments, a setting item gadget, in which a reduce/enlarge-ratio setting for selecting a print reduce/enlarge ratio is set to 100%, is displayed (see FIG. 2, FIG. 6, FIG. 12, and the like); however, another configuration, in which a reduce/enlarge ratio is to be selected from several reduce/enlarge ratio candidates, can be employed. FIG. 14 is a diagram illustrating another example of the reduce/enlarge-ratio item gadget for use in specifying a reduce/enlarge ratio. The reduce/enlarge-ratio item gadget illustrated in FIG. 14 includes a plurality of print reduce/enlarge-ratio setting buttons for "100%," "75%," "125%," and "150%," whereby when any one of the reduce/enlarge-ratio setting buttons is pressed by a user, the print reduce/enlarge ratio is set to a value specified by the thus-pressed button. FIG. 15 is a diagram illustrating still another example of the reduce/enlarge-ratio item gadget for use in specifying the print reduce/enlarge ratio. The reduce/enlarge-ratio item gadget illustrated in FIG. 15 contains an area to receive an entry specifying a desired ratio and, upon receiving an entry from a user specifying a desired reduce/enlarge-ratio, sets the print reduce/enlarge ratio to the thus-received ratio.

Displaying such a gadget as discussed above, from which settings for a setting item can be specified, on the simplified display allows specifying settings as required also on the simplified display.

Figure 16:
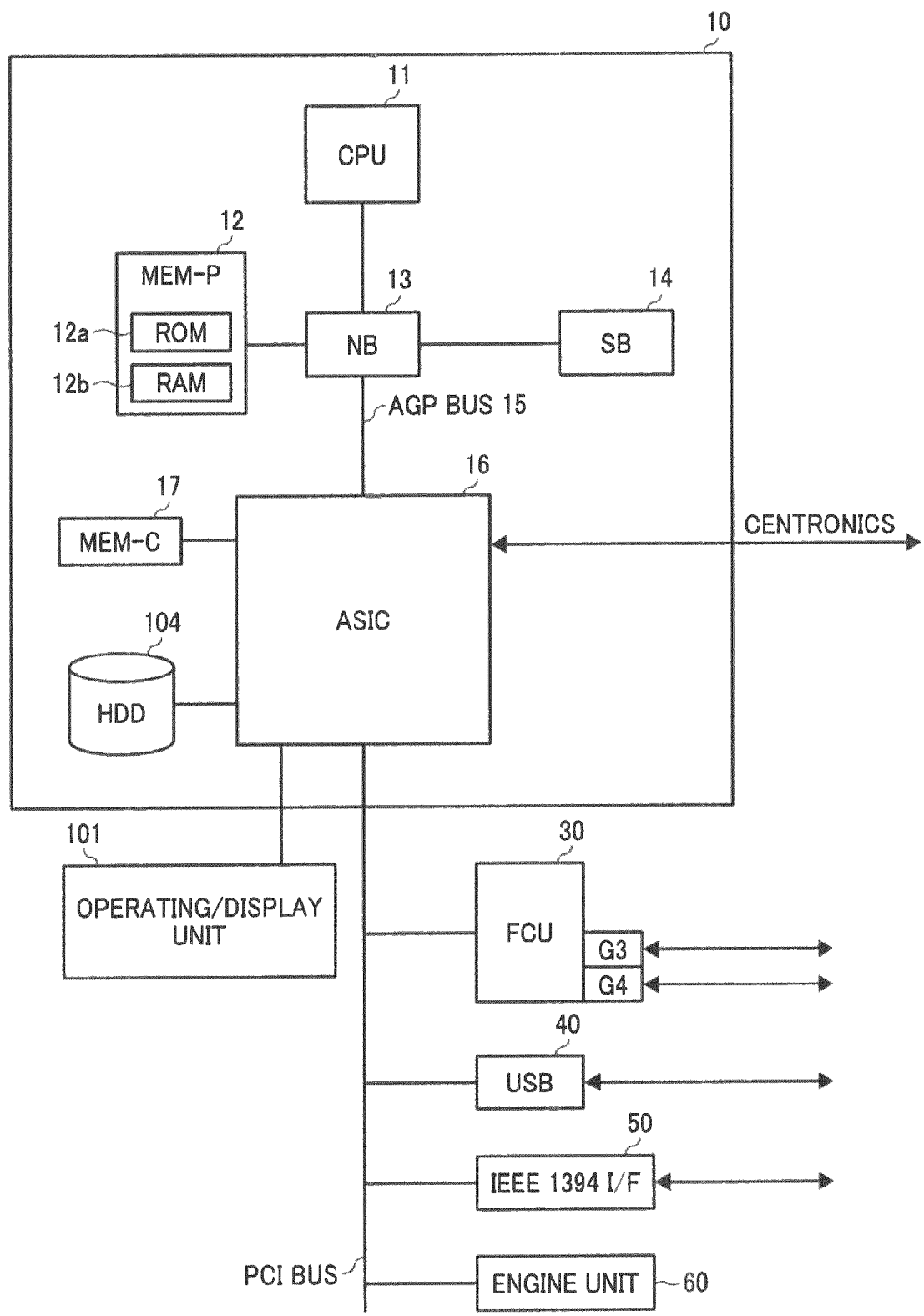
FIG. 16 is a block diagram illustrating a hardware configuration of the multifunction peripheral according to the first and second embodiments.

FIG. 16 is a block diagram illustrating a hardware configuration of the MFP according to the first and second embodiments. As illustrated in FIG. 16, the MFP 100, 800 includes a controller 10 and an engine unit 60 that are connected to each other with a peripheral component interface (PCI) bus. The controller 10 is a controller that controls the overall MFP 100, 800, picture processing, communications, and inputs fed from an operating unit (not shown). The engine unit 60 is a printer engine or the like that is connectable to the PCI bus. Examples of the engine unit 60 include a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 10 includes a CPU 11, a north bridge (NB) 13, a system memory (hereinafter, "MEM-P") 12, a south bridge (SB) 14, a local memory (hereinafter, "MEM-C") 17, an application-specific integrated circuit (ASIC) 16, and the HDD 104. The NB 13 and the ASIC 16 are connected to each other with an accelerated graphics port (AGP) bus 15. The MEM-P 12 includes a read only memory (ROM) 12a and a random access memory (RAM) 12b.

The CPU 11 that controls the overall MFP 100, 800 includes a chipset that includes the NB 13, the MEM-P 12, and the SB 14, and is connected to other devices via the chipset.

The NB 13 is a bridge for connecting the CPU 11 to the MEM-P 12, the SB 14, and the AGP bus 15, and includes a PCI master, an AGP target, and a memory controller that controls reading and writing from and to the MEM-P 12 and the like.

The MEM-P 12 is a system memory for use as a memory for storing computer programs and data, a memory for expanding computer programs and data therein, a memory for use in picture processing performed by the printer, and the like, and includes the ROM 12a and the RAM 12b. The ROM 12a is a read only memory for use as a memory for storing computer programs and data. The RAM 12b is a writable and readable memory for use as a memory for expanding computer programs and data therein, a memory for use in picture processing performed by the printer, and the like.

The SB 14 is a bridge for connecting the NB 13 to PCI devices and to peripheral devices. The SB 14 is connected to the NB 13 via the PCI bus, to which a network interface (I/F) unit and the like are also connected.

The ASIC 16, which is an integrated circuit (IC) for use in image processing, includes a hardware component for the image processing and functions as a bridge that connects the AGP bus 15, the PCI bus, the HDD 104, and the MEM-C 17 therebetween. The ASIC 16 includes a PCI target and an AGP master, an arbiter (ARB) serving as the core for the ASIC 16, a memory controller that controls the MEM-C 17, a plurality of direct memory access controllers (DMACs) that control rotation of image data and the like by hardware logic or the like, and a PCI unit that performs data transfer to and from the engine unit 60 via the PCI bus. A facsimile control unit (FCU) 30, a universal serial bus (USB) 40, and an IEEE 1394 (the Institute of Electrical and Electronics Engineers 1394) interface 50 are connected to the ASIC 16 via the PCI bus. The operating and display unit 101 is directly connected to the ASIC 16.

The MEM-C 17 is a local memory for use as a copy image buffer and a code buffer. The HDD 104 is a storage for storing image data, computer programs, font data, and forms.

The AGP bus 15 is a bus interface for a graphics accelerator card introduced to speed up graphics operations and allows direct access to the MEM-P 12 with a high throughput, thereby speeding up operations related to the graphic accelerator card.

Information registration computer programs to be executed by the MFP 100, 800 can be provided as being preinstalled in a ROM or the like.

The information registration computer programs to be executed by the MFP 100, 800 can be configured so as to be provided as being recorded in a computer-readable recording medium, such as a compact disk read-only memory (CD-ROM), a flexible disk (FD), a CD recordable (CD-R), or a digital versatile disk (DVD), in an installable or executable format.

The information registration computer programs to be executed by the MFP 100, 800 can be configured so as to be stored in a computer connected to a network such as the Internet so that the computer programs are provided by downloading via the network. The information registration computer programs to be executed by the MFP 100, 800 can be configured so as to be provided or distributed via a network, such as the Internet.

The information registration computer programs to be executed by the MFP 100, 800 have a module structure made of the above-mentioned units (the input control unit 102, 802, the display control unit 103, 803, the registration unit 108, 808, the image processing unit 105, the printer engine 106, the scanner engine 107, and the searching unit 805). As actual hardware, the CPU reads the information registration computer programs from the ROM and executes them to load the units on the main memory, thereby generating the input control unit 102, 802, the display control unit 103, 803, the registration unit 108, 808, the image processing unit 105, the printer engine 106, the scanner engine 107, and the searching unit 805 on the main memory.

According to an aspect of the invention, an advantage that a simplified display can be customized easily is provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image forming apparatus comprising:
an operating and display unit that displays information and receives inputs entered by a user;
a display control unit that displays, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable;
an input control unit that receives selection of a desired setting item made on the detailed display displayed on the operating and display unit; and a registration unit that registers the function-selection information of the setting item, the selection of which has been received, on the simplified display.

2. The image forming apparatus according to claim 1, wherein when the input control unit receives the selection of the desired setting item, the display control unit displays a first candidate list that contains candidates for the function-selection information of the setting item, the selection of which has been received, on the operating and display unit in a manner to allow selection from the candidates, the input control unit receives selection of desired function-selection information from the first candidate list, and the registration unit registers the function-selection information selected from the first candidate list on the simplified display.

3. The image forming apparatus according to claim 1, wherein when the input control unit has received the selection of the desired setting item made on the detailed display, the input control unit further receives an entry specifying setting contents of the setting item, the selection of which has been received, and the registration unit registers the function-selection information of the setting item, the selection of which has been received, on the simplified display after updating the function-selection information to reflect the setting contents, the entry of which has been received.

4. The image forming apparatus according to claim 1, wherein when the simplified display has no more area to display the function-selection information, the registration unit registers the function-selection information of the setting item, the selection of which has been received, by replacing function-selection information having already been displayed on the simplified display with the function-selection information of the setting item, the selection of which has been received.

5. The image forming apparatus according to claim 2, further comprising a searching unit that searches through a network for indicative information that can be displayed on the simplified display, wherein the display control unit displays a second candidate list that contains candidates for the indicative information obtained by the search, on the operating and display unit in a manner to allow selection from the second candidate list, the input control unit receives selection of desired indicative information from the second candidate list, and the registration unit registers the indicative information selected from the second candidate list on the simplified display.

6. An information registration method to be performed on an image forming apparatus that includes:

an operating and display unit that displays information and receives inputs entered by a user;

a display control unit;

an input control unit; and a registration unit, the information registration method comprising:

displaying, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable, under control of the display control unit;

receiving, by the input control unit, selection of a desired setting item made on the detailed display displayed on the operating and display unit; and registering, by the registration unit, the function-selection information of the setting item, the selection of which has been received, on the simplified display.

7. A non-transitory computer-readable medium having computer-readable program codes embodied in the medium for registering information in an image forming apparatus that includes an operating and display unit, a display control unit, an input control unit, and a registration unit, the program codes when executed causing a computer to execute:

displaying, on the operating and display unit, a detailed display, on which setting contents of setting items are specifiable, and a simplified display that contains function-selection information that represents setting contents of a predetermined setting item among the setting items displayed on the detailed display in a manner that setting contents of the predetermined setting item are specifiable, under control of the display control unit;

receiving, by the input control unit, selection of a desired setting item made on the detailed display displayed on the operating and display unit; and registering, by the registration unit, the function-selection information of the setting item, the selection of which has been received, on the simplified display.

* * * * *